United States Patent [19]
Bickel

[11] 3,806,944
[45] Apr. 23, 1974

[54] VLF FREQUENCY DIVERSITY TRAILING WIRE TRANSMITTING ANTENNA

[75] Inventor: John E. Bickel, San Diego, Calif.

[73] Assignee: The United States of America as represented by the Secretary of the Navy, Washington, D.C.

[22] Filed: Feb. 2, 1973

[21] Appl. No.: 329,287

[52] U.S. Cl. .................................. 343/707, 343/722
[51] Int. Cl. ............................................. H01q 1/30
[58] Field of Search ............................. 343/707, 722

[56] References Cited
UNITED STATES PATENTS

| | | | |
|---|---|---|---|
| 1,893,287 | 1/1933 | Jenkins | 343/707 |
| 2,282,292 | 5/1942 | Amy et al. | 343/722 |
| 2,229,865 | 1/1941 | Morgan | 343/722 |

Primary Examiner—Eli Lieberman
Attorney, Agent, or Firm—R. S. Sciascia; G. J. Rubens; J. W. McLaren

[57] ABSTRACT

Aircraft VLF/LF frequency diversity transmitting antenna. The antenna comprises a long trailing wire of length approximately equal to one-half the wavelength of the lower of two operating frequencies. A resonant circuit is connected to the wire at a distance from the aircraft and transmitter approximately equal to one-half the wavelength of the higher of the two frequencies. The resonant circuit is tuned to one of the two frequencies to effectively connect or disconnect the portion of the wire between the resonant circuit and the far end of the wire in accordance with which of the two frequencies is exciting the trailing wire, whereby the antenna reactance is changed to facilitate retuning.

2 Claims, 2 Drawing Figures

VLF FREQUENCY DIVERSITY TRAILING WIRE TRANSMITTING ANTENNA

BACKGROUND OF THE INVENTION

VLF radio signals are subject to various vector interference phenomena that can produce sharp, deep minima simultaneously with rapid, signal phase shift. Furthermore, if the transmitting antenna is inclined and rotates with time, modulations of the signal amplitude can occur. Obviously these interference phenomena can be detrimental to VLF communication systems, and therefore, their avoidance or elimination is desirable.

In diversity, a system is operated under two or more conditions that are selected so that if one of the conditions produces an interference minimum, the other is likely to produce a maximum. For example, in frequency diversity, communication is attempted on two frequencies selected so that if the field produced by one is in a propagation minimum, the field produced by the other is in a propagation maximum whereby the detrimental effect of the propagation minima is eliminated.

With respect to aircraft VLF/LF frequency diversity transmissions, long trailing wire transmitting antennas can provide the performance described above. However, a severe limitation of existing trailing wire antennas is that they are relatively narrow band devices whose length must be changed physically to alter the transmitting frequency. The physical alteration requires several minutes of time, which obviously is a serious system operational limitation.

Consequently, a trailing wire system is desirable which is resonant at two different VLF/LF frequencies simultaneously and which can be rapidly retuned. Rapid shifting between frequencies is then possible to optimize implementation of frequency diversity. One possible technique comprises the use of a counterpoise wire which trails above the wire behind the aircraft. The counterpoise is either connected to or disconnected from the airframe to change antenna reactance to achieve retuning of the wire antenna.

SUMMARY OF THE INVENTION

The inventive concept disclosed herein comprises an airborne VLF/LF transmitting antenna operable simultaneously at two, different VLF/LF frequencies. The antenna can be rapidly retuned and essentially comprises a long trailing wire antenna of length $\lambda_1/2$ at the lower of two operating frequencies $F_1$. A resonant circuit is electrically connected to the wire at a distance of $\lambda_2/2$ from the transmitter at the aircraft and at the higher of the two frequencies which energizes it and to which it is tuned to thereby effectively connect or disconnect the portion of the wire between it and the end of the wire whereby the antenna reactance is changed in a corresponding manner to facilitate retuning of the antenna. The resonant circuit is contained in a relatively small housing which is clamped to a portion of the wire which is insulated.

OBJECTS OF THE INVENTION

It is the primary object of the present invention to provide aircraft transmitting antenna resonant at two different VLF/LF frequencies simultaneously to enable frequency diversity transmission therefrom.

Other objects, advantages and novel features of the invention will become apparent from the following detailed description of the invention when considered in conjunction with the accompanying drawings.

DESCRIPTION OF THE PREFERRED EMBODIMENT

Figure 1:
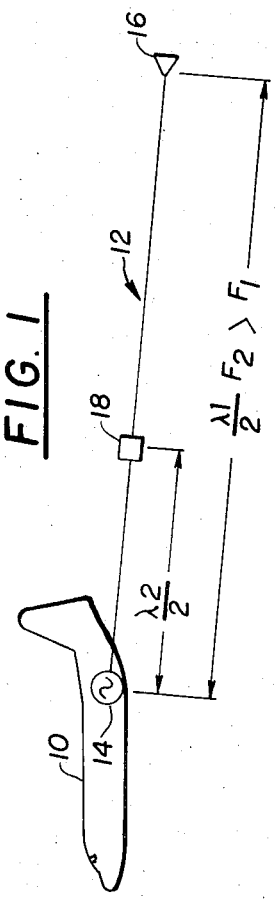
FIG. 1 is an illustration of an airborne aircraft towing a deployed, trailing wire antenna embodying the present inventive concept.
Figure 2:
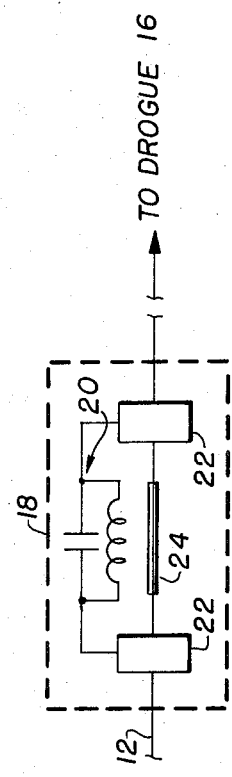
FIG. 2 is a simplified illustration of the resonant circuit shown connected to the trailing wire antenna in FIG. 1.

In FIG. 1, an airborne aircraft 10 is shown towing a deployed, trailing wire antenna 12 which is connected to the aircraft in a conventional manner. A VLF radio generator 14 in the aircraft is electrically connected to the antenna for transmission of energy. The trailing wire antenna comprises a conventional device which is attached to and towed by the aircraft in a well-known manner.

At the end of the wire 12 away from the aircraft, is attached a drogue 16. The drogue 16 comprises a conventional, well-known device.

As mentioned previously, the antenna is intended to be operable simultaneously at two VLF/LF frequencies. This objective is achieved by connecting a resonant circuit 18 at a selectively predetermined position on the wire 12. The circuit functions to alter the effective length of the wire by changing the antenna reactance whereby retuning is facilitated. In operation, the resonant circuit 18 effectively connects or disconnects the portion of the antenna between the circuit 18 and the drogue from the other portion. The resonant circuit is rigidly supported in the metallic or non-metallic housing 18. As can be seen the circuit comprises an LC circuit 20 which is electrically connected to the wire 12 by the clamps 22. The portion of the wire 12 located between the two clamps 22 is insulated whereas the rest of the wire is not insulated.

Assuming that the frequencies to be transmitted comprise a low frequency $F_1$ and a high frequency $F_2$, the total length of the wire 12 is approximately equal to $\lambda_1/2$ in accordance with conventional antenna theory. The length of the wire portion between the aircraft 10 and the resonant circuit 18 is likewise approximately equal to $\lambda_2/2$.

Thus it can be seen that novel VLF/LF antenna apparatus operable in diversity modes has been disclosed. The preferred embodiment comprises a variable length, trailing wire antenna for use with aircraft VLF/LF communication systems. A resonant circuit connected at a distance from a transmitter aboard the aircraft approximately equal to $\lambda_2/2$ where $F_2$ is the higher of two operating frequencies. The resonant circuit is tuned to effectively connect or disconnect the portion of the wire between it and a drogue attached to its end depending upon which of the two frequencies are exciting it. Thus the total length of the trailing wire is changed electrically from $\lambda_1/2$ to $\lambda_2/2$ whereby the antenna reactance is altered to facilitate retuning.

Obviously many modifications and variations of the present invention are possible in the light of the above teachings. It is therefore to be understood that within

What is claimed is:

1. Aircraft, VLF/LF frequency diversity transmitting antenna apparatus comprising:

transmitter means aboard an aircraft for transmitting in frequency diversity energy at frequencies $F_1$ and $F_2$, wherein $F_2$ is greater than $F_1$, trailing wire antenna means connected to the output of said transmitter means, said trailing wire antenna being suspended at one end from said aircraft and being connected at the opposite end to drogue means, said trailing wire antenna having a total length approximately equal to $\lambda_1/2$; and, resonant circuit means supported in a nonmetallic housing and electrically connected to said trailing wire antenna means between said aircraft and said drogue means and at a distance from said transmitter means approximately equal to $\lambda_2/2$ and being responsive to said frequencies $F_1$ and $F_2$ to effectively change the length of said trailing wire antenna means by a length approximately equal to the distance from said resonant circuit means to said droque means.

2. The apparatus of claim 1 wherein said LC circuit is tuned to a selectively predetermined one of said two frequencies.

* * * * *